United States Patent [19]
Jacot et al.

[11] Patent Number: 6,065,934
[45] Date of Patent: May 23, 2000

[54] SHAPE MEMORY ROTARY ACTUATOR

[75] Inventors: Arthur Dean Jacot, Kent; Gerald J. Julien, Edgewood; Dan J. Clingman, Auburn, all of Wash.

[73] Assignee: The Boeing Company, Seattle, Wash.

[21] Appl. No.: 09/032,415

[22] Filed: Feb. 27, 1998

Related U.S. Application Data

[60] Provisional application No. 60/039,660, Feb. 28, 1997.

[51] Int. Cl.[7] ........................................... B64L 27/00
[52] U.S. Cl. ..................... 416/155; 416/153; 416/23; 416/39; 60/527; 244/75 R
[58] Field of Search ............................... 415/48; 416/153, 416/155, 23, 24, 39, 140; 60/527; 244/75 R

[56] References Cited

U.S. PATENT DOCUMENTS

| | | |
|---|---|---|
| 4,010,455 | 3/1977 | Stange . |
| 4,695,014 | 9/1987 | Mourani ................................. 244/75 R |
| 4,700,541 | 10/1987 | Gabriel et al. . |
| 4,761,955 | 8/1988 | Bloch . |
| 4,798,051 | 1/1989 | Foote . |
| 4,887,430 | 12/1989 | Kroll et al. . |
| 4,965,545 | 10/1990 | Johnson . |
| 5,127,228 | 7/1992 | Swenson . |
| 5,150,864 | 9/1992 | Roglin et al. . |
| 5,317,875 | 6/1994 | O'Brien et al. . |
| 5,626,312 | 5/1997 | Head ...................................... 244/75 R |
| 5,975,468 | 11/1999 | Moignier et al. ......................... 60/527 |

*Primary Examiner*—Edward K. Look
*Assistant Examiner*—Richard Woo
*Attorney, Agent, or Firm*—Christensen O'Connor Johnson Kindness PLLC

[57] ABSTRACT

A rotary actuator (18) is provided, including an actuator assembly (20). The actuator assembly includes a torque tube (24) formed of a shape memory alloy, a super elastic NiTinol return spring (26) having a proximal end (46) and a distal end (44), and a torque tube heating element (30) positioned near the torque tube. The torque tube (24) includes a proximal end (32) and a distal end (34). The return spring and torque tube are connected at their ends, with the torque tube being pretwisted while in a martensitic state relative to the spring. Activation of the heating element causes the torque tube to enter an austenitic state in which it returns to its previous untwisted configuration. Removal of heat allows the torque tube to return to a martensitic state, further allowing the return spring to retwist the torque tube. Further provided is a unique locking assembly (22) for use with the actuator assembly. Further provided is a helicopter blade twist rotation system for use with a rotor craft blade (200) having a blade root (202) and a tip (204). The system includes a shape memory alloy rotary actuator (18) located within the blade near the blade root, and a passive torque tube (206) located within the blade and having a proximal end connected to the rotary actuator and a distal end connected to the blade near to the blade tip.

28 Claims, 10 Drawing Sheets

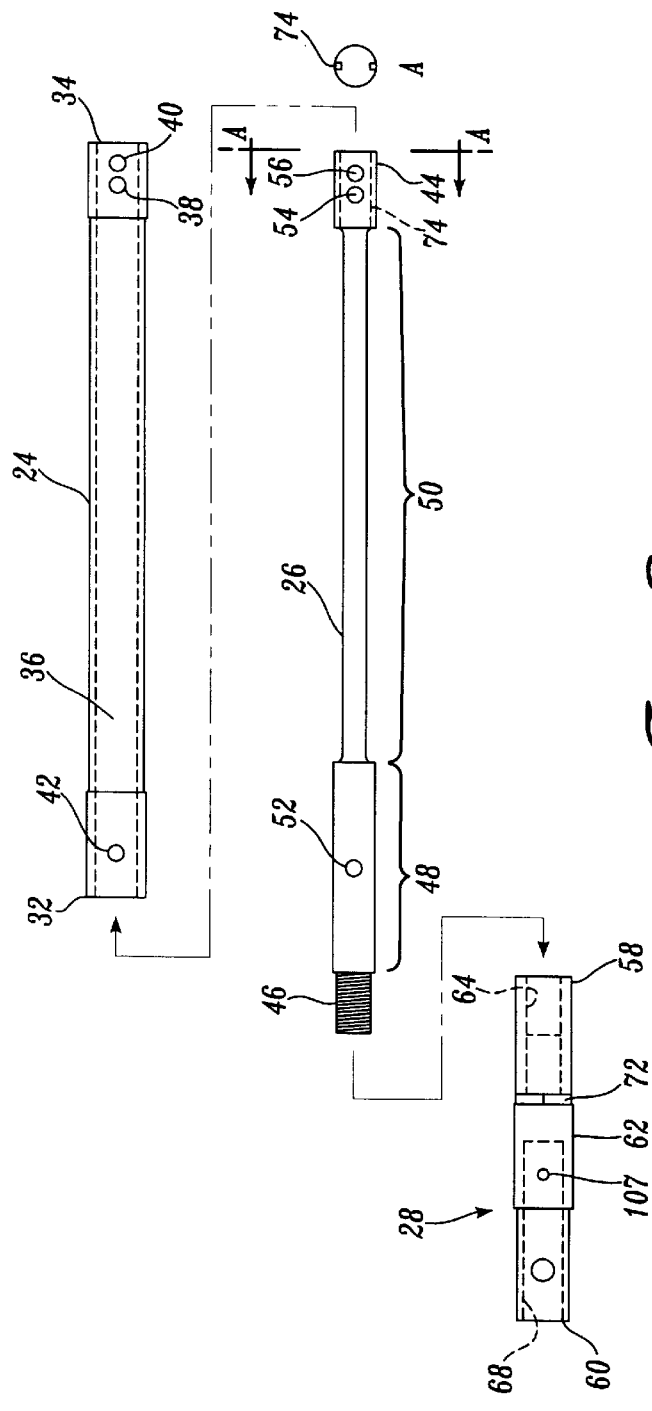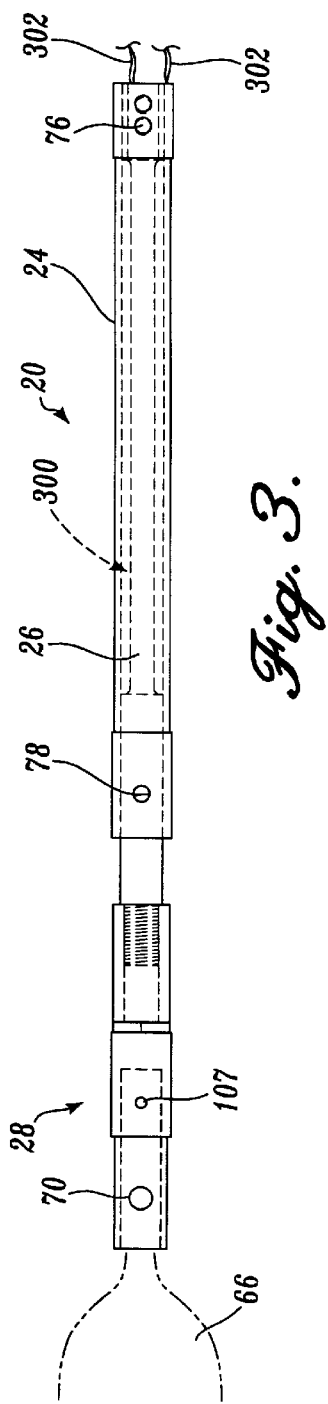

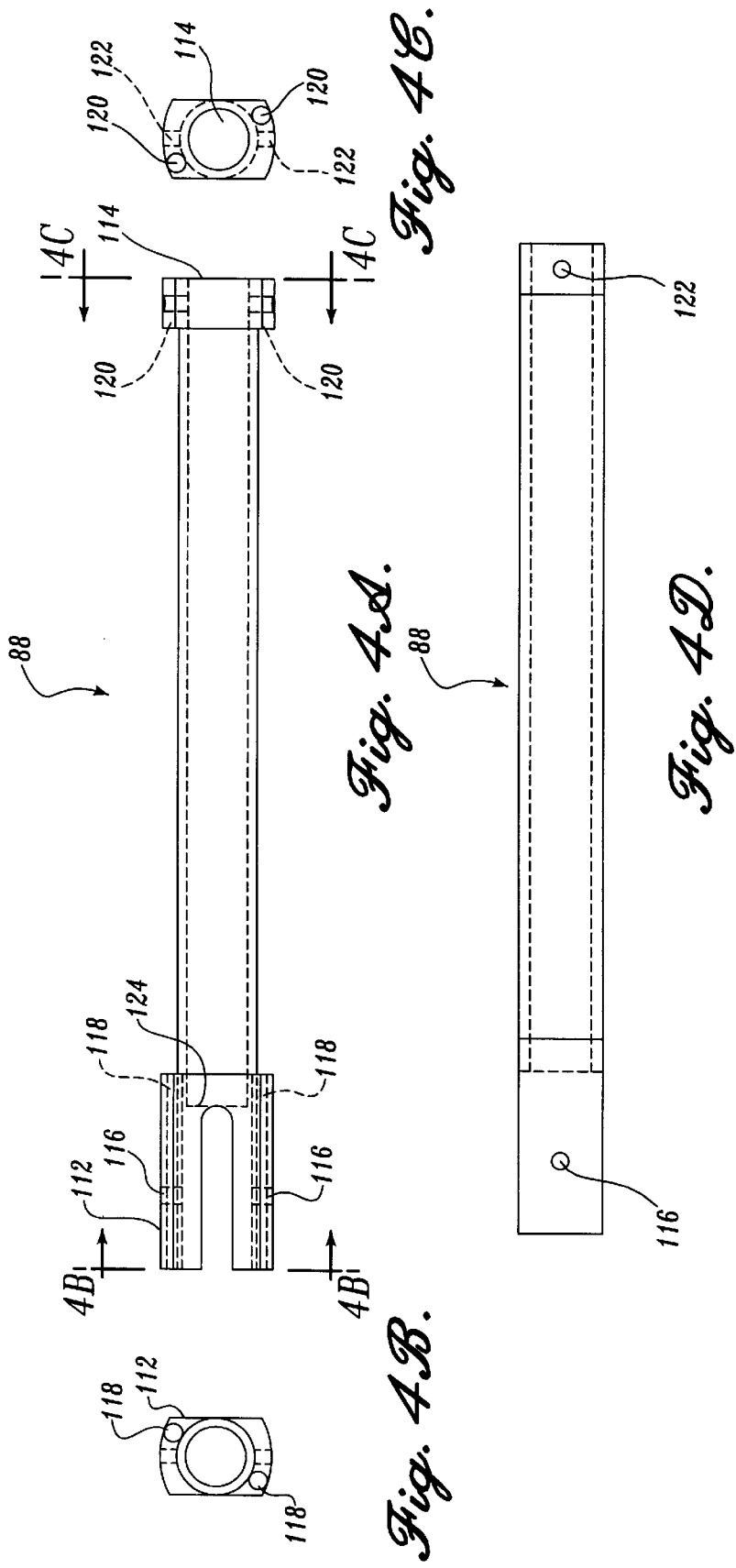

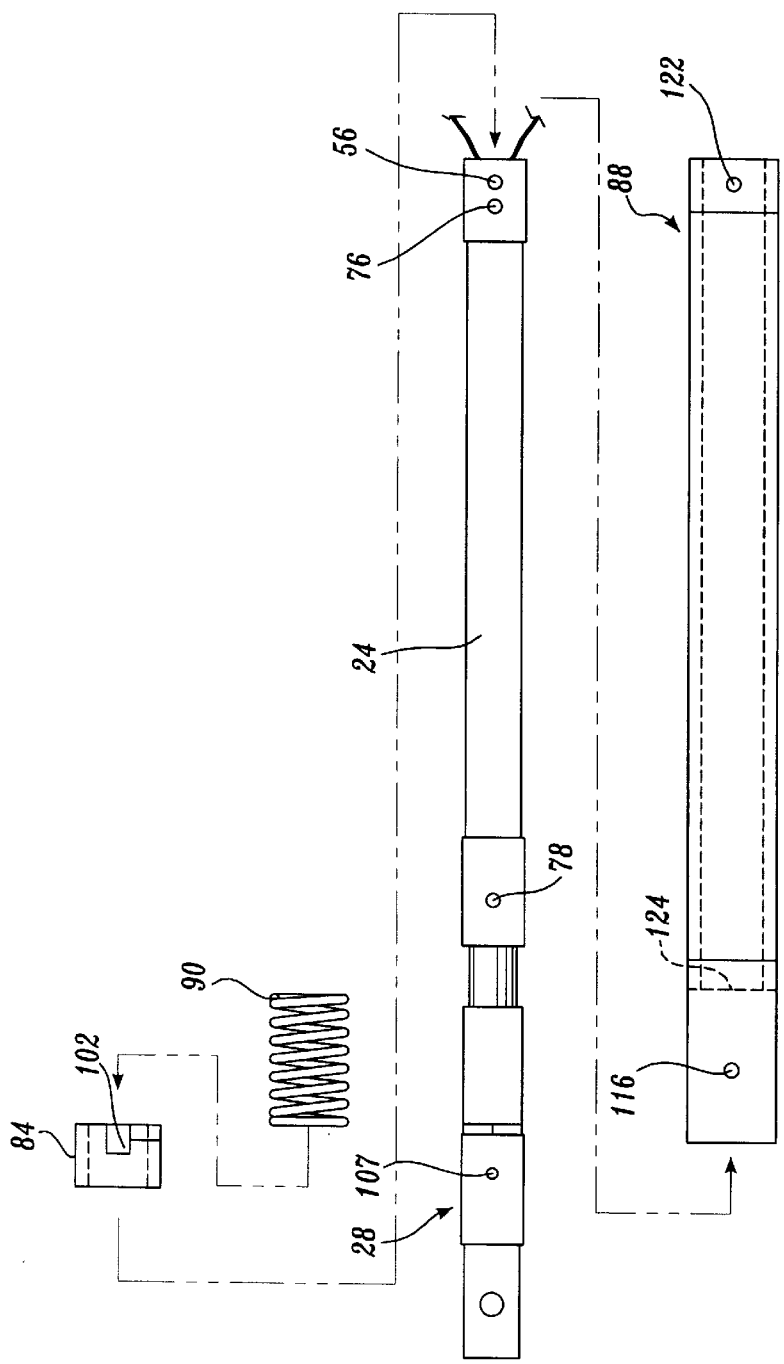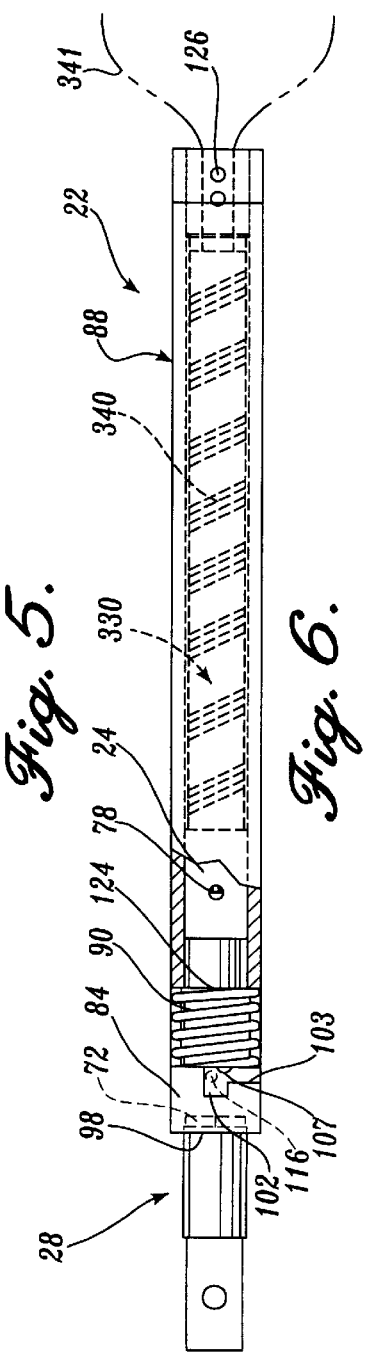
Fig. 5.
Fig. 6.

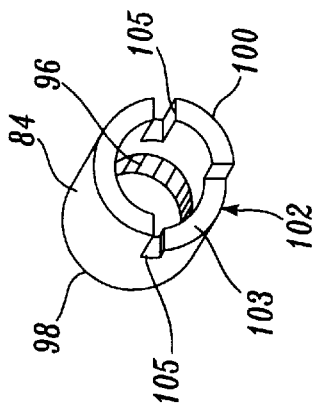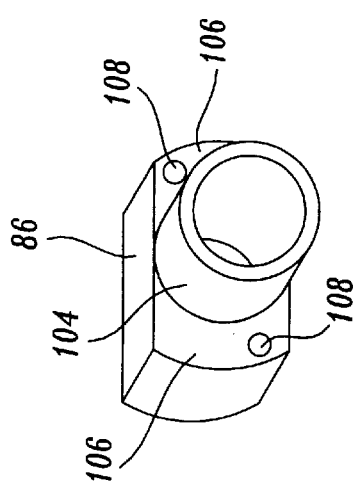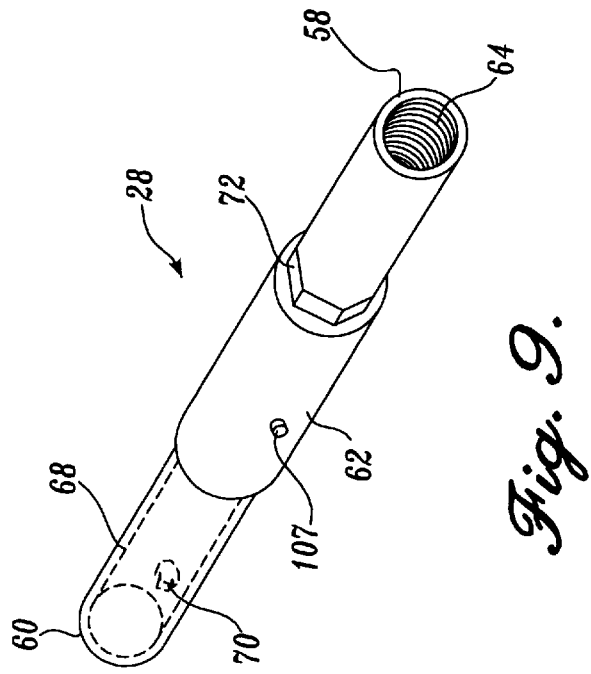

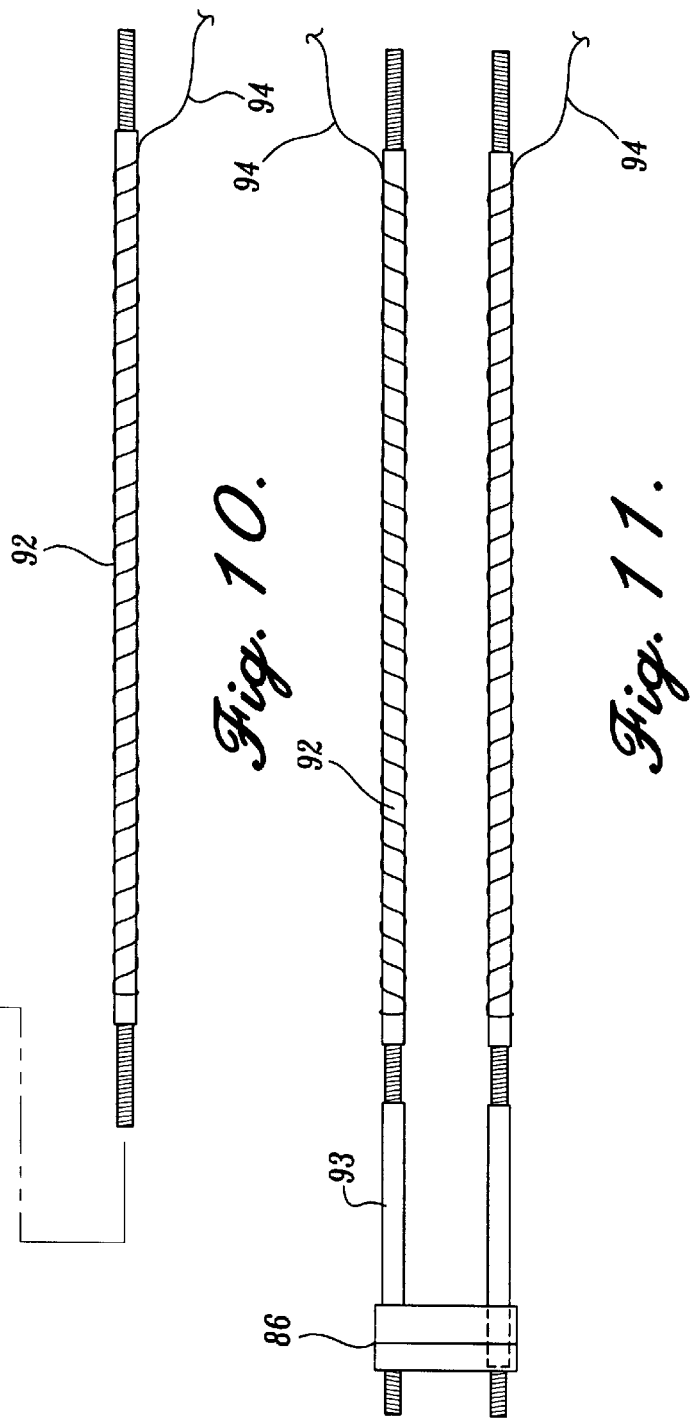
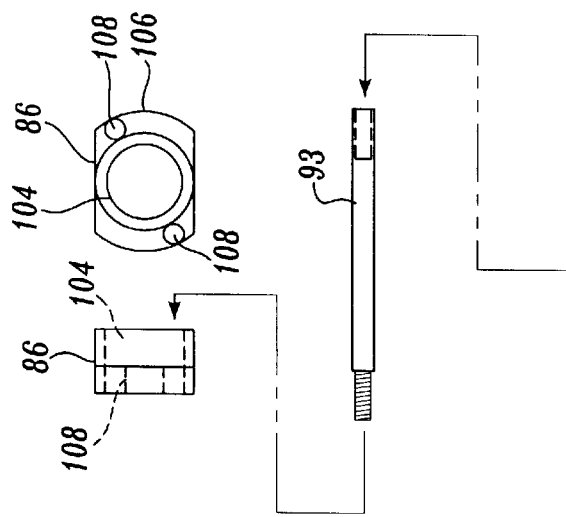

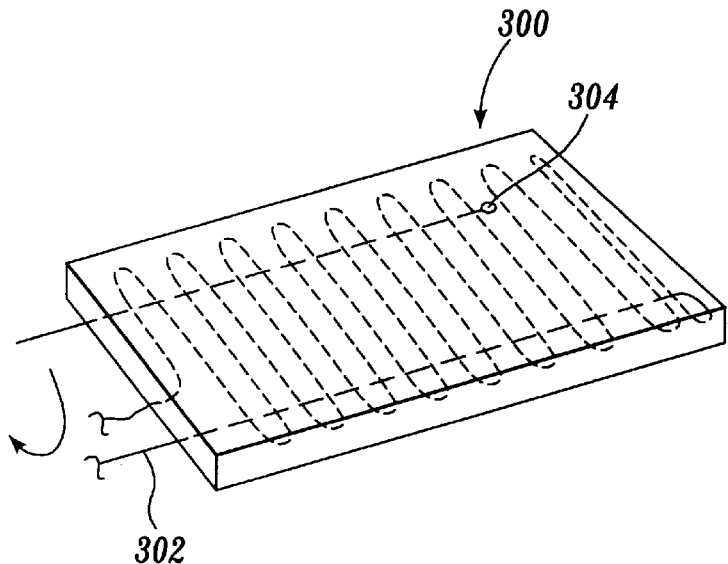
Fig. 12.
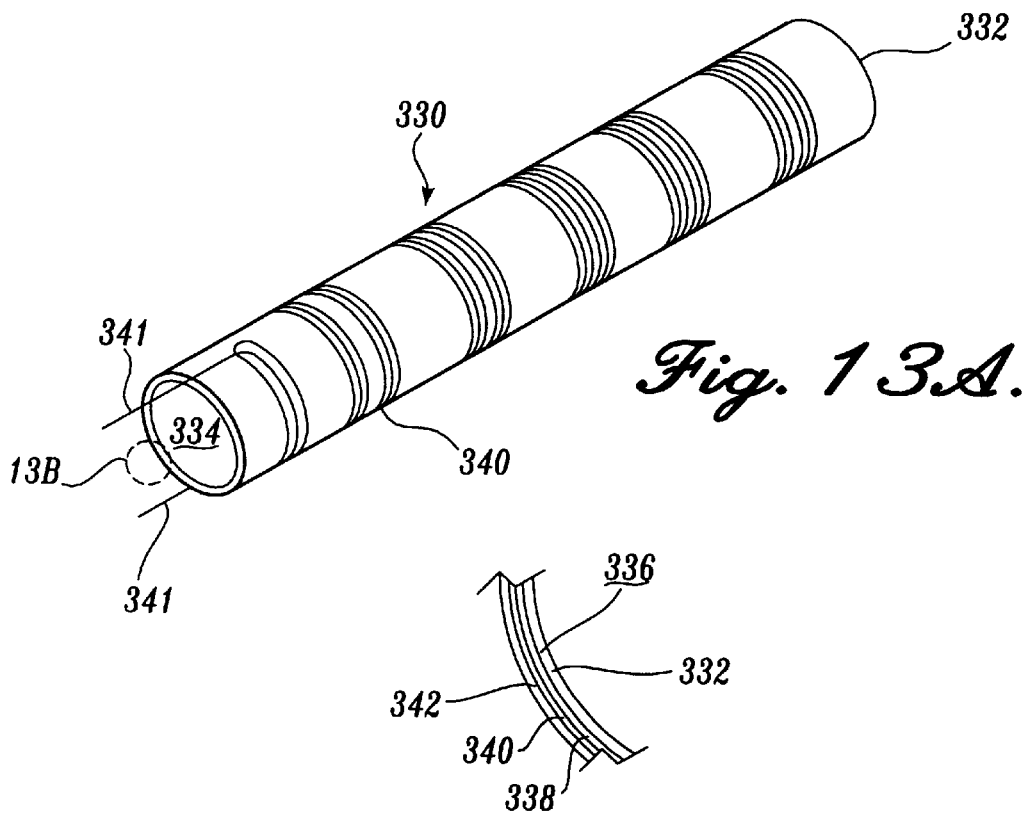
Fig. 13A.
Fig. 13B.

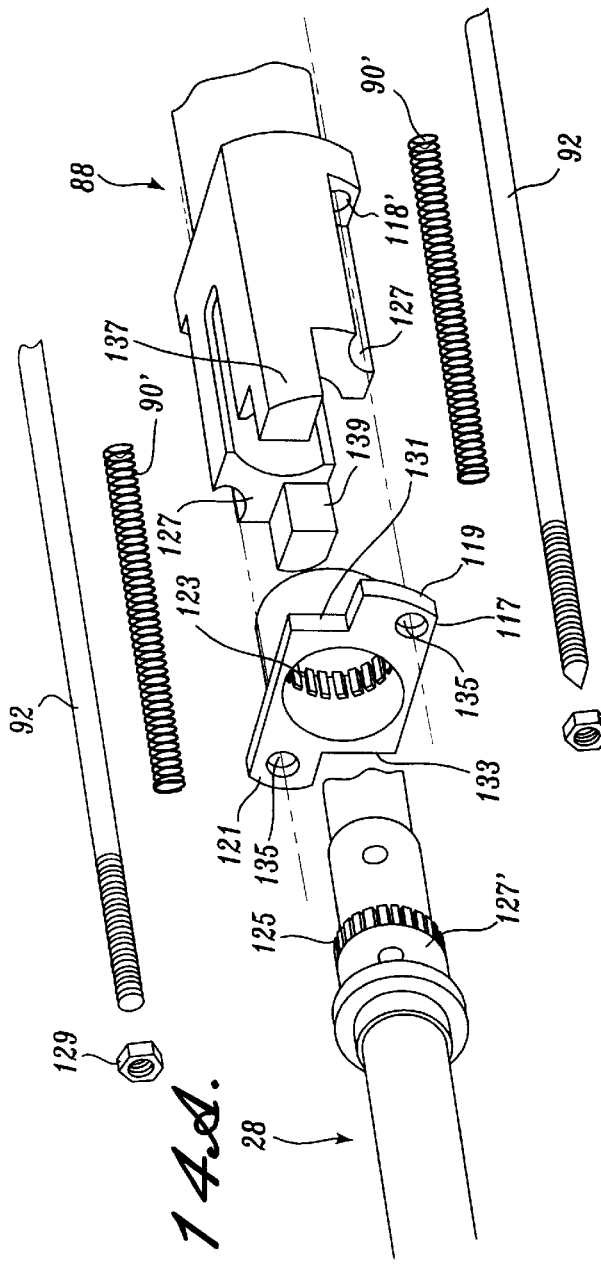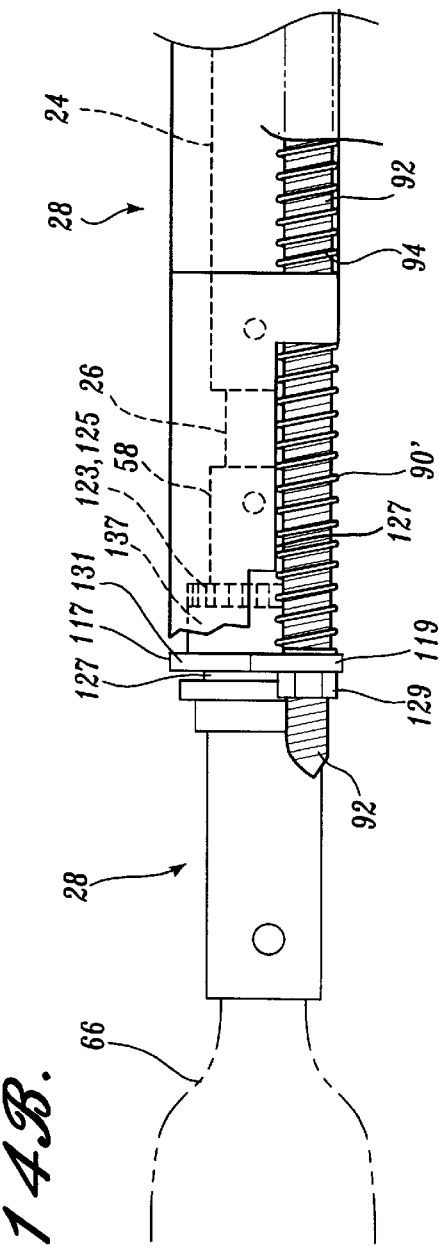
Fig. 14A.
Fig. 14B.

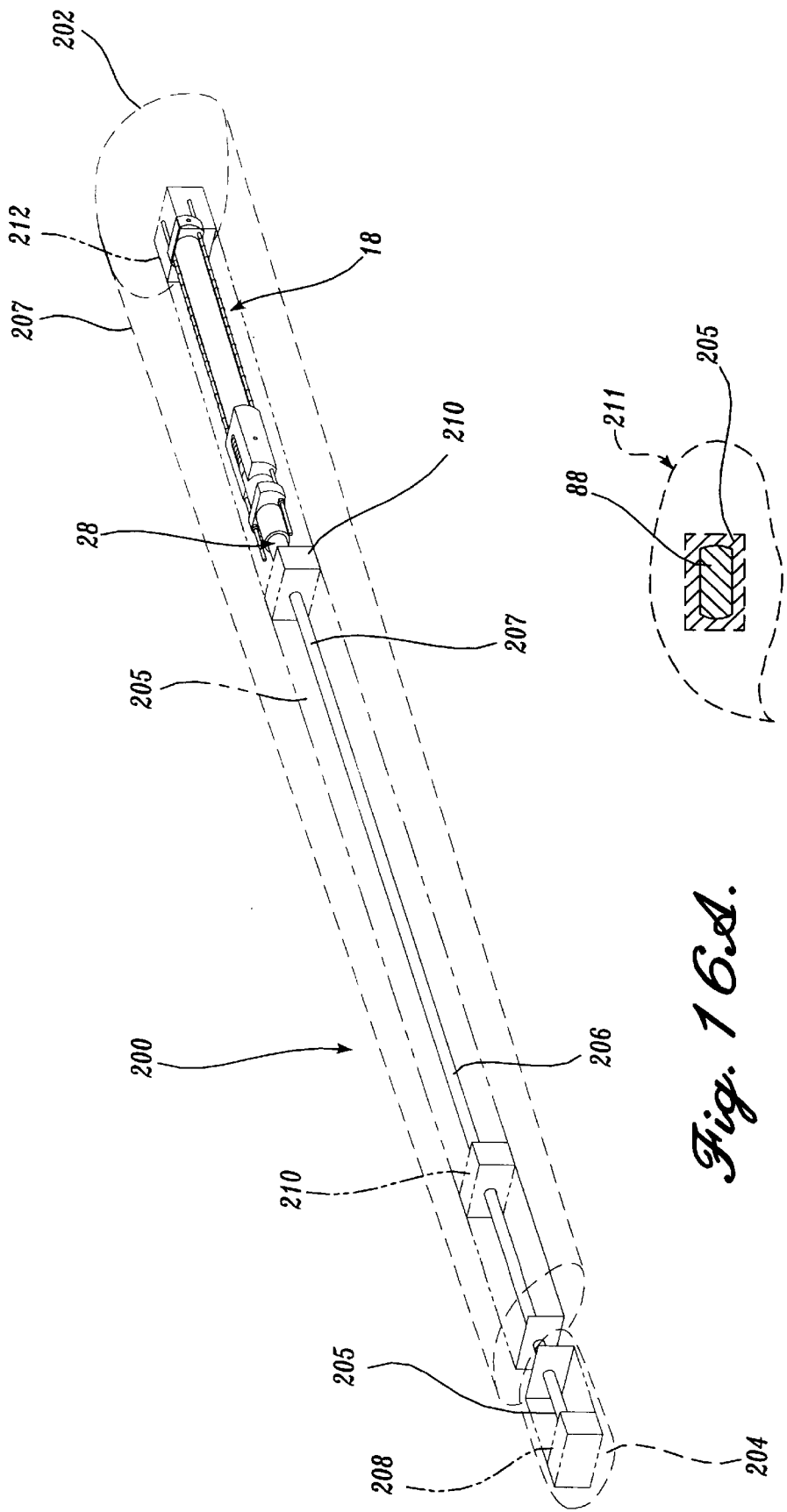

SHAPE MEMORY ROTARY ACTUATOR

REFERENCE TO RELATED APPLICATION

This application claims the benefit of U.S. Provisional Application No. 60/039,660, filed Feb. 28, 1997 of the same title.

IDENTIFICATION OF INTEREST

The U.S. Government may have an interest in this application under contract number F49620-95-2-0097.

FIELD OF THE INVENTION

The present invention relates to Machine Elements that perform rotary functions, and more specifically rotary actuators utilizing shape memory alloys (SMA) that reciprocate between positions.

BACKGROUND OF THE INVENTION

Shape memory alloys (SMA) form a group of metals that have interesting thermal and mechanical properties. If a SMA component is deformed while in a martensitic state (low yield strength condition) and then heated to its transition temperature to reach an austenitic state, the SMA component will resume its original (undeformed) shape. The rate of return to the original shape depends upon the amount and rate of thermal energy applied to the component. When heat is removed from the component, it will return to the martensitic state in which the component can again be deformed.

A known SMA rotary actuator is described in U.S. Pat. No. 5,127,228. The device of the '228 patent includes two concentric tubular SMA members. The inner SMA member is twisted relative to the outer SMA member, and the ends of both members are mechanically restrained to an indexed position. One of the SMA members is provided to generate mechanical torque clockwise and the other member counterclockwise. Each SMA member has a dedicated heater connected to an electric power supply. Initially, both SMA members are in a martensitic state.

To operate the '228 device, electrical power is applied to the heater of an SMA members to cause that member to transition from martensitic to austenitic state. Upon rotation to a desired rotational position by one SMA member, electrical power is discontinued to that member and is applied to the other SMA member. This generates torque in the opposite direction. The application of force in both rotational directions thus appears to provide a means of holding the output of the actuator in a particular fixed position and providing rotation in both directions.

The '228 device suffers from a number of disadvantages. The most cumbersome aspect is that the '228 device requires two SMA components. To maintain a specific loaded rotational position, electrical power must be continuously applied to the heater elements of each SMA member. Both of these attributes add system weight and complexity as well as require excessive power. The '228 device is also problematic in that it requires a well considered design so that the heaters do not heat the wrong SMA member and thereby unintentionally create an actuator malfunction.

Other known SMA rotary actuators utilize one rather than two SMA members to provide rotation. These devices use the SMA member to provide rotation in one direction, while using a conventional spring to provide rotation of the actuator in the other or return direction. SMA rotary actuators which use conventional springs are limited in the scope of their application, since the force generated by conventional springs is limited. Thus, for such actuators to be utilized for large force application, the springs would need to be large. This adds considerable weight and bulk to the actuator mechanism. Such actuators also require electrical power to either the SMA member or heater elements to continuously maintain the SMA member in a fixed rotational position. Another limitation of these actuators is the fact that conventional springs deteriorate over time, which limits the reliability of the actuator.

Therefore, a need exists for a SMA rotary actuator which can provide either low or high amounts of torque, operate in both directions of rotation using a single SMA member, be capable of maintaining a desired position of rotation upon removal of heat from the SMA member, and be capable of rotation in the opposite direction without the application of electrical power. In an ideal arrangement, the rotary actuator would be capable of generating a very large rotation torque over a large angle, be capable of locking in a desired position, be capable of returning to the neutral (or zero) position upon removal of electrical power or disengagement of a lock and would not utilize conventional springs solely for the counter (return to neutral) force. To provide for installation in limited space locations, the actuator should also be small in size and have low weight.

SUMMARY OF THE INVENTION

In accordance with aspects of this invention, a rotary actuator for rotating an object is provided. The rotary actuator includes a shape memory alloy torque tube having a proximal end and a distal end, a super elastic return spring having a proximal end connected to the torque tube proximal end and a distal end connected to the torque tube distal end, and a torque tube heating element positioned near the torque tube. The torque tube is longitudinally twisted relative to the super elastic return spring. Activating the heating element causes the torque tube to enter an austenitic state in which the torque tube returns to a previous untwisted configuration. Removal of heat causes the torque tube to return to a martensitic state, thereby allowing the super elastic return spring to retwist the torque tube.

In accordance with further aspects of this invention, a connector is attached to the super elastic return spring proximal end. Further, a locking assembly is provided that includes a housing having proximal and distal ends, a lock socket having first and second positions, a spring positioned between the socket and the housing distal end, at least one shape memory alloy rod stretched while in a martensitic state to interconnect between the housing distal end and the socket, and a heating element adapted to heat the at least one actuator rod. The torque tube and the super elastic return spring are located within the housing. At least one of the torque tube and super elastic return spring is connected to the housing distal end. In the socket first position, the socket is non-rotatably engaged with the connector. In the socket second position, the socket is rotatably engaged with the connector. The spring continuously urges the socket into its first position. The at least one rod is trained for memory in length. Activating the heating element causes the at least one rod to enter an austenitic state in which the rod returns to its unstretched length, further causing the socket to move to its second position to allow rotation of the connector and the attached super elastic return spring.

In accordance with other aspects of this invention, a helicopter blade twist rotation system is provided for use with a helicopter blade having a blade root end, a blade tip end, and a longitudinal spar extending from the blade root end toward the blade tip. The blade twist rotation system includes a shape memory alloy rotary actuator adapted to be connected to the blade spar near the blade root, and a torsionally flexible passive torque tube adapted to be connected to the blade spar. The passive torque tube has a proximal end connected to the rotary actuator and a distal end connected to the blade near to the blade tip. Rotation of the rotary actuator causes like rotation of the torque tube proximal end and rotation of the torque tube distal end of an amount less than the rotation angle of the torque tube proximal end.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a side view illustrating the connection of components in an actuator assembly formed for use in the embodiment of FIG. 1;

FIG. 3 is a side view of the combined components of FIG. 2 and one embodiment of a heating element;

FIGS. 4A–4D are top, end, opposite end, and side views of a housing for use in the embodiment of FIG. 1;

FIG. 5 is a side view illustrating the connection of the actuator assembly of FIG. 2 with a portion of a first embodiment locking assembly formed in accordance with the present invention for use in the actuator embodiment of FIG. 1;

FIG. 6 is a side view of the combined components of FIG. 5 and a second embodiment of a heating element;

FIGS. 7, 8, and 9 are perspective views of various first embodiment locking assembly components;

FIG. 10 is a side view illustrating the linear SMA actuator rods and heating elements in the first embodiment locking assembly;

FIG. 11 is a side view of the combined components of FIG. 10;

FIG. 12 is a perspective view of one embodiment of a heating element formed in accordance with the present invention;

FIG. 13A is a perspective view of a second embodiment of a heating element formed in accordance with the present invention;

FIG. 13B is a detail view of a portion labeled 13B in FIG. 13A;

FIGS. 14A and 14B are perspective and side views respectively of an alternative arrangement of a locking assembly formed in accordance with the present invention;

FIGS. 16A and 16B are perceptive and end views respectively of a rotary actuator formed in accordance with the present invention as applied to a rotor blade.

DETAILED DESCRIPTION OF THE PREFERRED EMBODIMENT

Figure 1:
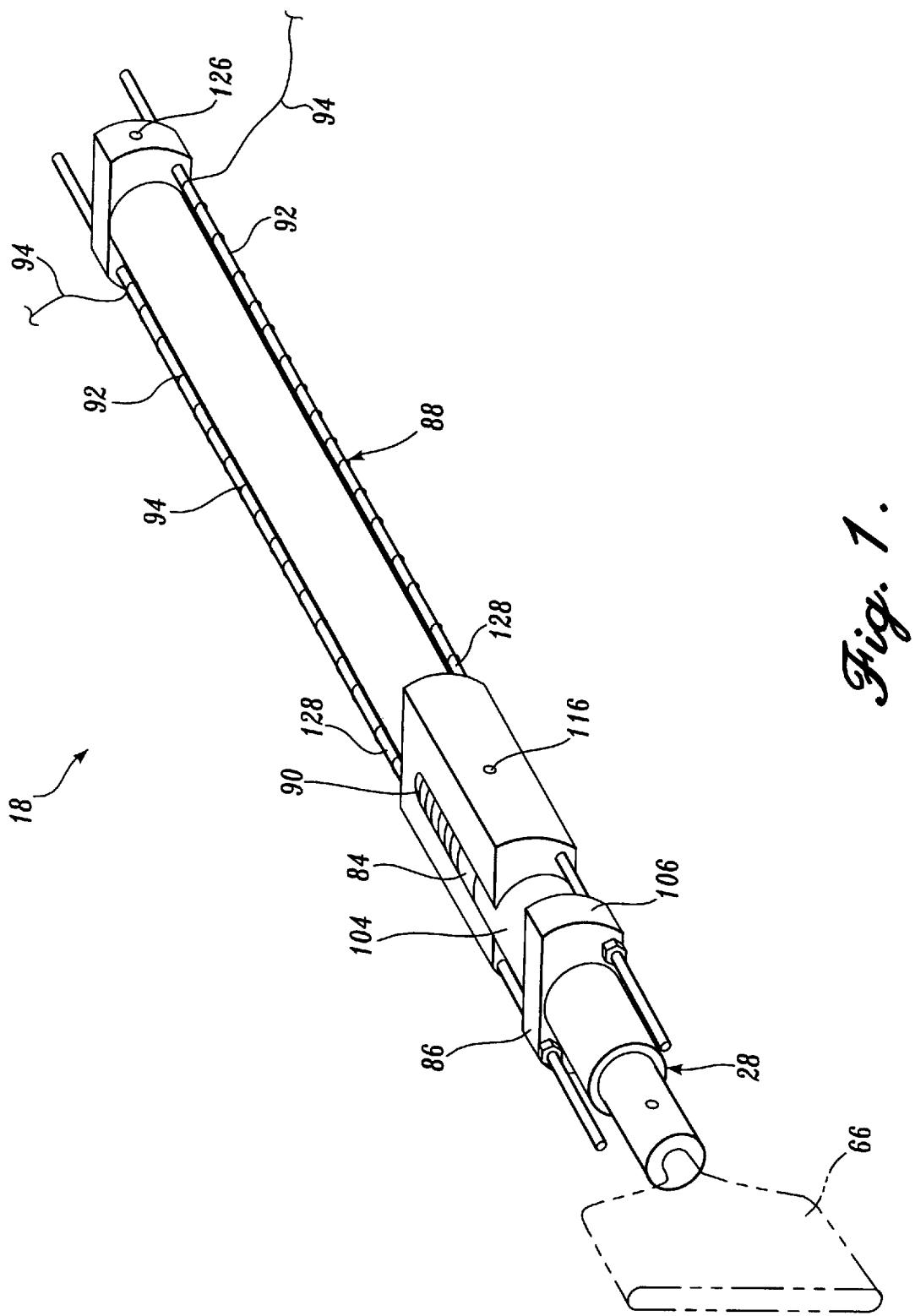
FIG. 1 is a perspective view of one embodiment of a SMA rotary actuator formed in accordance with the present invention.

The present invention is a SMA rotary actuator operated by a single SMA member which is prestrained in one position. Mechanical rotational force is provided by the SMA member to an object when thermal energy is applied to the SMA member to the point where the SMA material changes from the martensitic condition to the austenitic condition. The speed of rotation is controlled by the rate and amount of heat applied to the SMA member. Rotational position is monitored by a sensor and a desired position is held by a locking mechanism. When rotation in the opposite direction is required, the lock is disengaged and a super elastic SMA return spring provides the mechanical force required to rotate the SMA member (and hence the output of the device) back to the neutral position.

A rotary actuator 18 formed in accordance with the present invention includes an actuator assembly 20 and preferably a locking assembly 22. The actuator assembly is interconnected between two objects to provide torque therebetween. The actuator assembly includes a SMA torque tube 24 and a torsional super elastic return spring 26. The torque tube 24 is twisted while in a martensitic state and then attached at both ends to the super elastic return spring 26 using mating pin and pin hole pairs. The super elastic return spring 26 is composed of a nickel-titanium alloy SMA whose composition and processing is such as to enhance super elastic properties so that the material behaves as a very high energy spring at actuator operating temperatures. In the super elastic form, the material does not exhibit shape memory properties during normal use. Heating the SMA torque tube 24 causes the tube to return to its memory (pre-twisted) shape, thereby causing angular rotation in one direction. This occurs because the strength of the austenitic torque tube is greater than the resisting strength of the super elastic return spring.

After discontinuing the application of heat, the torque tube returns to its martensitic state. The super elastic return spring 26 rotates the now martensitic actuator assembly in the opposite direction, thus causing the tube 24 to return to its previous twisted state. The locking assembly 22 is provided to keep the actuator assembly 20 in a desired angular orientation without having to continuously apply heat. Example applications for which the present invention is particularly well suited include rotor craft blades, wind turbines, propellers, airplane wings, fan blades, and the like.

Figure 15A:
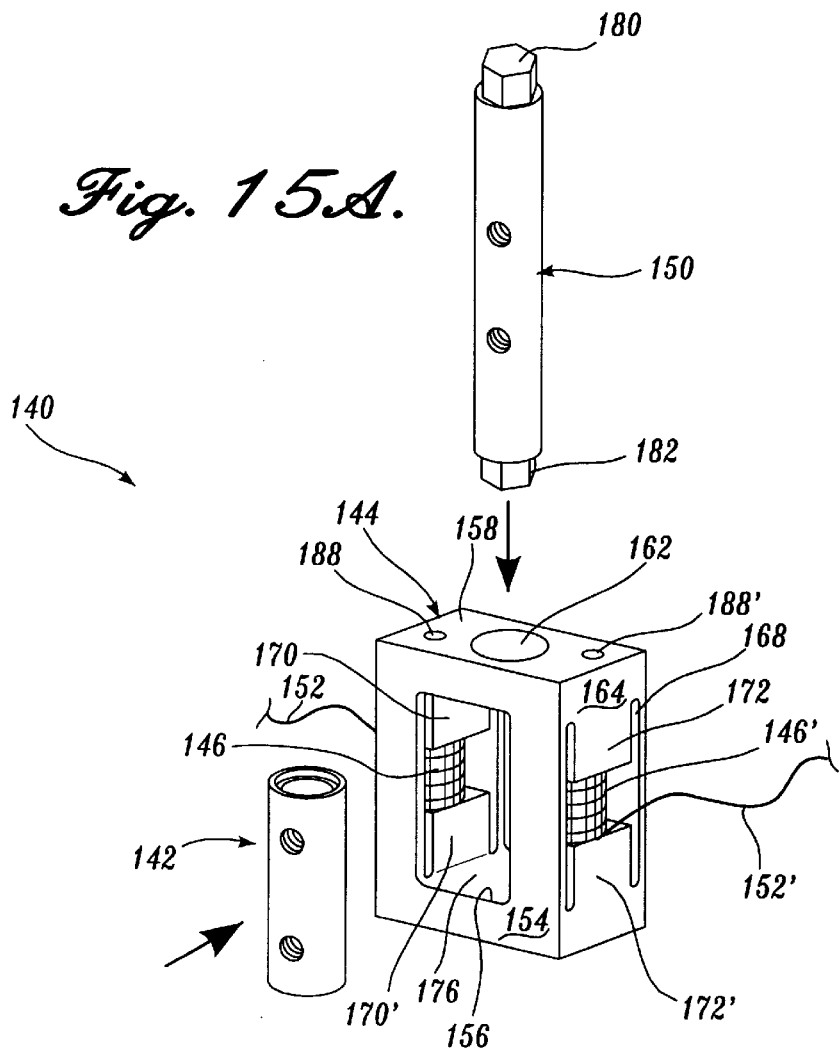
FIGS. 15A and 15B are exploded perspective and side views of a second embodiment of a locking assembly formed in accordance with present invention.
Figure 15B:
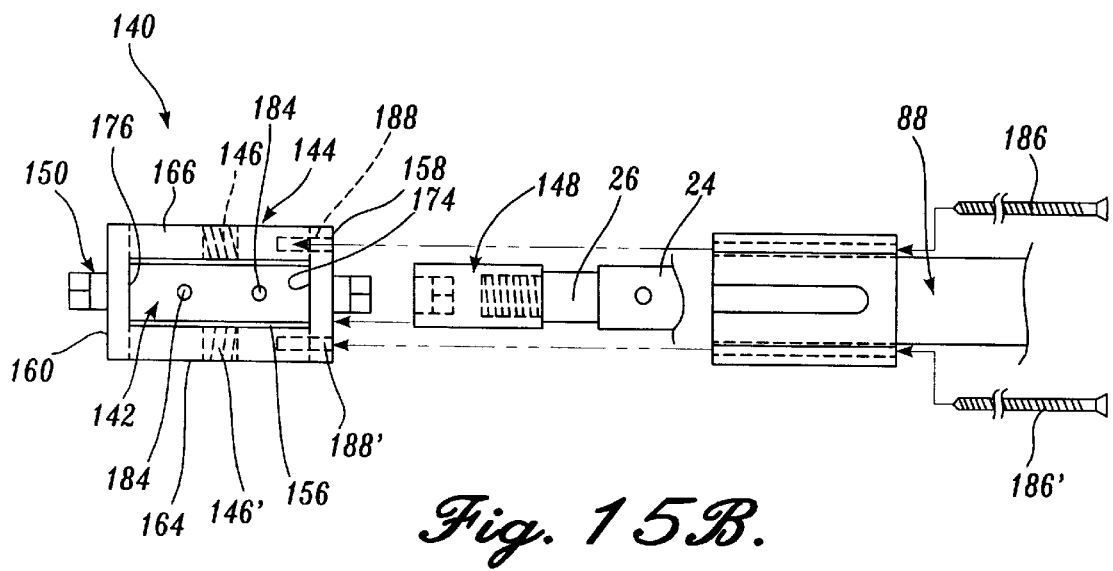

FIGS. 1–11 describe one embodiment of a rotary actuator formed in accordance with the present invention. Other arrangements are possible. FIGS. 12 and 13 illustrate first and second embodiments of heating elements. FIGS. 14A and 14B are illustrations of an alternative locking assembly arrangement. FIGS. 15A and 15B are illustrations of a second embodiment locking assembly formed in accordance with the present invention. FIGS. 16A and 16B are illustrations of a present invention rotary actuator applied to a rotor craft blade. In this embodiment, the actuator allows the rotor craft blade to be twisted during flight to enhance rotor craft performance.

Referring to FIGS. 2 and 3, the actuator assembly 20 includes the SMA torque tube 24, the torsional super elastic return spring 26, a connector 28, and a torque tube heating element 30 (FIGS. 12 and 13.) The combination of the torque tube 24 and super elastic return spring 26 provides the actuator rotation. The connector 28 provides a connection between the torque tube 24 and the locking assembly 22 and the means by which an object to be rotated is connected to the torque tube 24.

In FIG. 2, the SMA torque tube 24 is shaped as a cylinder having a proximal end 32, a distal end 34, and an intermediate portion 36 extending therebetween. The ends 32, 34 are preferably structurally reinforced to provide sufficient integrity during connection with the super elastic return spring 26. The distal end 34 includes first and second retaining holes 38, 40 formed therethrough in an orientation transverse to the torque tube longitudinal centerline. The proximal end 32 includes a first retaining hole 42 formed in a like manner.

The dimensions of the torque tube 24 will vary according to the design requirements of a particular application. In general, the torque tube inner and outer diameters influence the amount of torque available from the actuator and should be selected accordingly. The tube 24 is formed of a shape memory alloy, e.g., 55-NiTinol or the like. Since the torque tube 24 will be repeatedly taken between its martensitic and austenitic states, it is important to select an alloy having a transition temperature that is appropriate for that application. Prior to assembly, the torque tube must undergo torsion strain and recovery cycling to be trained in memory.

The super elastic return spring 26 is preferably shaped as a rod having a distal end 44, a proximal end 46, a tube-connection portion 48 located near the proximal end 46, and an intermediate portion 50 extending between the tube-connection portion 48 and the proximal end 46. The tube-connection portion 48 includes a retaining hole 52 formed therethrough in an orientation transverse to the torque tube longitudinal centerline. The distal end 44 includes first and second retaining holes 54, 56 formed in a like manner.

The tube-connection portion 48 and distal end 44 are shown in FIG. 2 as having a diameter that is larger than the intermediate portion 50 diameter. The spring 26 may alternatively be formed having a single diameter. Similar to the torque tube 24, the super elastic return spring ends 44, 46 are structurally sufficient to provide a sure connection with the torque tube 24. The specific dimensions of the torque tube 24 spring 26 will depend on the to the design requirements of a particular application, e.g., the torsional loading requirements, the angle of rotation, etc.

As shown in FIGS. 2 and 9, the connector 28 is a relatively short tubular member having a first end 58, a second end 60, and a middle portion 62 located between the ends. The connector first end 58 is connected to the super elastic return spring proximal end 46. Shown best in FIG. 2, the connection is formed by screwing the return spring proximal end 46 into a threaded longitudinal bore 64 located in the connector first end 58. A preferred method of threading is described in U.S. application Ser. No. 08/349,872 titled, "Threaded Load Transferring Attachment" filed Dec. 6, 1994. The connector second end 60 connects the actuator with an object 66 (shown in phantom in FIGS. 1 and 3) to be rotated. A novel arrangement for using the rotary actuator is shown and described with reference to FIGS. 16A and 16B.

A preferred connector includes a longitudinal hole 68 formed in the connector second end 60. A portion of the object 66 is inserted into the hole and is secured therein using a retaining pin 70 as shown in FIGS. 1 and 3. The object 66, the connector 28, and the torque tube 24 are aligned longitudinally so that rotation of the tube causes like rotation of the connector and the object. The above connections are provided as exemplary arrangements only. Other connection methods may be used between the connector 28, the object 66, and the torque tube 24.

The connector 28 further includes components for connecting to the locking assembly 22. In the embodiment shown in FIGS. 2 and 9, the connector middle portion 62 has a slightly larger diameter than the connector ends 58, 60. A thin hex-shaped surface 72 is formed in the middle portion along its edge closest to the connector first end 58. Portions of the locking assembly 22 engage the hex surface 72 as described in detail below. Other arrangements are possible, depending on the locking assembly used.

FIG. 12 shows one embodiment (labeled 300) of a SMA torque tube heating element 30. The heating element 300 includes six layers stacked one on top of each other. Preferred six layers include (from bottom to top): copper or aluminum tape, Kapton tape, Nicrome foil, Kapton tape, a heater wire 302 and temperature sensor 304 (i.e., a thermal couple), and Kapton tape. The combination is rolled longitudinally to form a tube. Referring to FIG. 3, the tube is positioned between the SMA torque tube and super elastic return spring, preferably contacting the interior surface of the SMA torque tube 24. The layers are sized so that they will fit appropriately and such that the requisite amount of heat is available at the torque tube to cause the torque tube to enter its austenitic state.

To improve the heating and cooling of the SMA torque tube, a second heating element (not shown) may be used and positioned on the exterior surfaces of the SMA torque tube. If a housing is used such as the one described below, the second heating element may be positioned between the SMA torque tube and the housing. The second heating element is formed similar to the first with an additional layer of Kapton tape added to the underside surface (i.e., to the interior surface of the rolled element.) FIGS. 13A and 13B show a second embodiment (labeled 330) of a SMA torque tube heating element 30 to be used in those embodiments that have a thermally conductive housing (such as the one described below) surrounding the torque tube 24. The heating element 330 includes a tubular structure 332 having interior and exterior surfaces 334, 336. A first thin layer 338 of electrically insulating material is placed on the exterior structure surface 336. Heating foil 340 (such as Nicrome ribbon) is wound about the first layer 338. A second thin layer 342 of electrically insulating material is then placed on the heating foil 340. The heating foil 340 includes wire leads 341 adapted to connect to a power source (not shown.) This embodiment is shown in FIG. 6. The heating foil 340 is wrapped as a pair to allow both leads to terminate on one end of the structure 332.

Still referring to FIG. 6, the heating element 330 is positioned between the SMA torque tube 24 and the housing, and is in thermal contact with both. The structure 332 is fixedly attached to the housing, thus, keeping the structure from rotating. A preferred attachment method is to use a thermal epoxy between the element 330 and the housing. Gaps between the SMA torque tube and the element 330 are filled with thermal grease to further improve thermal conductivity between the two. Grease also allows the tubular structure to perform an additional function as a bearing to hold the SMA torque tube.

The tubular structure 332 is formed from a heat conductive material, e.g., brass, copper, aluminum, steel, Inconel, titanium, silver, gold, etc. The structure walls are formed of a thickness sufficient to provide even heat distribution. The first and second thin layers 338, 342 are also formed from a thermally conductive material, though, significantly less thick than the tubular structure. Preferred layer materials include thermally conductive epoxy due to the ease at which it may be applied. The first layer is thinner (or, more specifically, less thermally resistive) than the second layer so that during heating, more heat will flow toward the SMA torque tube than to the housing. The second layer should still be sufficiently thermally conductive enough to promote rapid heat transfer to the housing. In this regard, a design compromise must be made between the time desired and power required to heat the SMA torque tube 24 to an austenitic state, verses the time desired to cool the tube back to a martensitic state.

During actuation, heat flows from the heating element 330 to the SMA torque tube 24. Once the heating element 330 stops producing heat, the element acts as a conduit to channel heat from the torque tube 24 to the housing 88. The housing 88 thus acts as the heat sink. This particular embodiment significantly reduces the amount of time required to transfer enough heat from the torque tube 24 to cause the tube to quickly return to its martensitic state.

Assembly of the actuator assembly depends on the type of heating element 30 used. If the one embodiment heating element 300 is used, the actuator assembly 20 is assembled by placing the element 300 about the return spring intermediate portion 50. The combination is inserted into the interior of the torque tube 24. The ends of the heating element are passed through one or more longitudinal slots 74 formed in the outer surface of the return spring distal end 44 and are connected to a power source (not shown). The torque tube 24 and return spring 26 are secured to each other by placing a retaining pin 76 in their aligned distal end holes 38, 54.

If the second embodiment heating element 330 is used, the tubular structure 332 is fixedly attached to the housing. The super elastic return spring 26 is inserted into the interior of the torque tube 24. The torque tube 24 and return spring 26 are secured to each other by placing the retaining pin 76 in the aligned distal end holes 38, 54.

For either heating element embodiment, the torque tube 24 is then held in a martensitic state and is rotated a desired amount relative to the return spring 26. A second retaining pin 78 is inserted in the torque tube proximal end first hole 42 and the tube-connecting portion retaining hole 52. By securing the twisted torque tube to the untwisted return spring, the actuator assembly 20 is biased in its initial condition. The combination of the super elastic return spring 26 and the SMA torque tube 24 are slip fit into the housing or housing/heating element 330 combination. For the second embodiment heating element 330, the gap between the combination and the element 330 is filled with thermal grease. The return spring proximal end 46 is connected to the connector first end 58 as described above.

To use, the heating element 30 is activated to heat the torque tube 24 and cause the tube's change to an austenitic state. Because the torque tube material has memory, during the austenitic state the tube will return to its pre-strained (or untwisted) configuration. The rotation of the torque tube 24 causes the return spring proximal end 46 to rotate due to the connection of the torque tube proximal end with the return spring at the retaining pin 78. Rotation of the return spring proximal end 46 then causes rotation of the return spring intermediate portion 50. When the heat is removed, the torque tube 24 changes back to martensitic and is capable of being re-deformed back to its initial condition by the force of the return spring intermediate portion 50 returning to its original untwisted configuration.

Although other types of return mechanisms may be used, the preferred return spring is a super elastic return spring as described above. Such a spring provides the advantage of maintaining a generally constant force over the actuation stroke and a much higher energy density. This attribute is not necessarily available from conventional springs.

The first embodiment of a locking assembly formed in accordance with the present invention includes a socket 84 (FIGS. 7, 10, 11), a yoke 86 (FIGS. 1, 8), a housing 88 (FIG. 6), a compression spring 90 (FIGS. 5, 6), a pair of linear SMA actuator rods 92 (FIGS. 1, 10, 11), and a pair of rod heating elements 94 (FIGS. 10, 11.) Various alternative embodiments of these locking components are illustrated in FIGS. 14A and 14B. A second embodiment of a locking assembly formed in accordance with the present invention is shown in FIGS. 15A and 15B.

Referring to FIG. 7, the socket 84 includes a tubular body with a 12-point female socket interior surface 96 at a first end 98 that is sized to mate with the connector hex surface 72. The socket 84 further includes a second end 100 having various cutouts 102 formed along the second end edge. The cutout 102 of FIG. 7 includes two opposed longitudinal sections 105 to stop the socket from rotating. As shown in FIGS. 6 and 9, the cutout 102 may optionally include an arcuate portion 103 to support a rotation stop pin 107 during actuator rotation and to bound the rotation of the connector between the arcuate portion's starting and ending locations. The rotation stop pin 107 extends radially outward a short distance from the connector middle portion 62 outer surface and is positioned to engage the cutouts 102.

Referring to FIG. 8, the yoke 86 includes a tubular pushing portion 104 and radial side extensions 106. The side extensions have longitudinal holes 108 extending therethrough for use in connecting with the linear SMA actuator rods 92. In FIGS. 1, 4A–4D, and 5, the housing 88 provides the structural means for supporting the yoke 86. The housing 88 is shaped as a tubular metal member having a distal end 114 and a forked proximal end 112. The forked proximal end 112 includes a pair of short guide pins 116 located radially inward through in each fork tine to the housing inner diameter. The forked proximal end 112 also includes a pair of longitudinal side holes 118.

The housing distal end 114 also includes radial side extensions with longitudinal holes 120 that align with the longitudinal holes 118. The distal end 114 further includes a single transverse hole 122 used in securing the actuator assembly 20 with the housing 88 via the torque tube hole 40 and the return spring hole 56. The inner diameter of the housing is stepped radially outward at a location 124 near the forked proximal end 112. The inner housing diameter between the step 124 and the distal end 114 is sized to closely fit the outer diameter of the torque tube 24. The inner housing diameter between the step 124 and the proximal end 112 is sized to closely fit the outer diameter of the compression spring 90, the socket 84, and the yoke pushing portion 104. See FIG. 1.

Referring to FIGS. 10 and 11, the linear SMA actuator rods 92 are trained for memory in length and for enhanced two-way memory. In the initial condition, the rods 92 are martensitic and are stretched in length. Upon application of heat, the rods 92 transition into their austenitic state, thus returning to their unstrained (pre-stretched) memory shape. The SMA actuator rod heating elements 94 are preferably Nicrome wire wrapped about the linear SMA actuator rods 92, as shown in FIGS. 1, 10, and 11.

Additional components may be provided as necessary. For example, various sensors may be inserted between the return spring 26 and the torque tube 24 for use in monitoring and controlling the performance of the actuator assembly, e.g., a temperature sensor, a strain gauge, potentiometers, differential reluctance transducers, thermal couples, etc.

The connection of the yoke 86, socket 84, housing 88, and actuator assembly is shown in FIG. 6. The socket 84 is placed on the connector so that the socket first end 12-point female socket surface 96 is engaged with the connector hex surface 72. Next, the compression spring 90 is placed around the actuator assembly adjacent the unengaged socket second end. This combination is placed in the housing 88 and the torque tube and return spring distal end holes 40, 56 are aligned with the housing transverse hole 122. A retaining pin 126 is secured therethrough. In connecting the actuator assembly with the housing 88, the compression spring 90 is forced to compress between the housing inner diameter step 124 and the socket 84, with the socket 84 itself being butted about the connector hex surface. In this manner, the actuator is locked. The torque tube 24 will not rotate even if heated, without first unlocking the locking assembly 22.

Continuing with the assembly of the locking assembly 22 and referring to FIG. 1, the yoke 86 is positioned around the connector middle portion 62 so that the yoke pushing portion 104 is near the socket 84. The yoke side extension holes 108 are aligned with the housing distal end side extension holes 120 and the side holes 118. The linear SMA actuator rods 92 are passed through the holes 118 and secured between the housing distal end 114 and yoke side extensions 106. In the embodiment of FIG. 11, the linear rods 92 are shortened and an extension member 93 is connected to each rod end in order to provide sufficient length to reach between the yoke 86 and housing distal end 114. Alternatively, the rods 92 may be single units of sufficient length. In either configuration, the attachment of the linear SMA actuator rods 92 between the yoke 86 and housing 88 should position the yoke pushing portion 104 adjacent the socket first end 98 during the locked actuator state.

The locking assembly 22 operates as follows. In the initial state, the linear SMA actuator rods 92 are deformed by being stretched in length. The socket 84 is engaged with the connector hex surface 72, and the compression spring 90 is in an initial compressed state. The actuator assembly 20 cannot rotate due to the connector 28 being constrained by the socket 84 and due to the direction of rotation being such that the pin 116 abuts against the bounds of the cutout 102. (In FIG. 6, the locking assembly is locked. When unlocked, the connector will rotate downward relative to the orientation of FIG. 6 during rotation of the connector relative to the housing.)

Upon application of heat from the rod heating elements 94, the linear SMA actuator rods 92 become austenitic and reduce in length. This causes the yoke 86 to move the socket 84 off the hex surface 72 and the spring 90 to compress further, since the linear force of the actuator rods 92 is greater than the compressive force of the spring 90. In moving off the hex surface, the socket 84 frees the connector to rotate. In addition, the housing proximal end guide pins 116 move along the longitudinal cutouts 105 of the socket, restraining socket rotation. The actuator assembly is free to rotate. If a connector pin 107 is used, it will be bounded by the arcuate cutout 103. Once heat is removed from the linear SMA actuator rods 92, the compression force of the spring 90 will force the socket 84 back onto the connector hex surface. This further causes the yoke 86 to move back to its initial position and the now martensitic linear SMA actuator rods 92 to re-deform to a stretched length.

Various alternative arrangements are possible. For example, mating splines or gear teeth may be used in lieu of a connector hex surface 72 and a 12-point socket. Using splines provides the opportunity for a greater angle resolution.

FIGS. 14A and 14B illustrate alternative components for use in locking assembly. Instead of a yoke 86 and socket 84, a single collar 117 is provided and includes side extensions 119, 121 to which the SMA actuator rods 92 are attached. Instead of mating hex surfaces, the embodiment of FIGS. 14A and 14B uses mating bands of gear teeth 123, 125 located between an interior circular surface of the collar and an outer circular surface of the connector, respectively. A retaining ring 127' is preferably positioned around and attached to the connector at the connector gear teeth 125 to serve as a stop against which the collar 117 cannot translate linearly beyond. The retaining ring 127' is provided for ease of manufacture. The connector 28 could alternatively be formed in a manner that includes a portion with increased diameter adjacent the connector gear teeth band 125.

Instead of a single compression spring 90 disposed between the socket 84 and the housing at location 124, two smaller compression springs 90' are provided and are positioned along the SMA actuator rods 92. The housing proximal end longitudinal holes 118' are shortened in length and exposed slots 127 are formed in their place. One compression spring 90' is positioned within one slot 127, and one actuator rod 92 is inserted through the housing hole 118', through the small compression spring 90', and into a corresponding hole 135 in the collar side extensions. The rod is secured therein with a nut 129. The other rod, spring, slot, hole, and nut are arranged similarly.

The collar side extensions 119, 121 each include an open notch 131, 133. The housing proximal end includes a pair of longitudinal arms 137, 139. The housing proximal end 112 inner diameter is sized to closely fit the outer diameter of the collar 127. During use, the collar 127 is position within the housing proximal end, with the housing arms 137 139 contacting the collar notches 131, 133. This ensures that the collar will not rotate relative to the housing, since the notches and arms push against each other. As will be appreciated from a reading of the above, this arrangement of collar notches and housing arms serves the same purpose accomplished by the pin 116 and longitudinal slot 105 of the arrangement shown in FIG. 6.

The alternative locking assembly operates as follows. In the initial state, the linear SMA actuator rods 92 are deformed by being stretched in length. The collar gear teeth 123 are engaged with the connector gear teeth 125, and the small compression springs 90" are in an initial compressed state. The actuator assembly 20 cannot rotate due to the connector being constrained by the collar teeth and due to both the connection of the collar to the housing via the SMA actuator rods 92 and the direction of rotation being such that the collar notches push against the housing arms 137, 139. (In FIG. 14B, the locking assembly is locked.)

Upon application of heat from rod heating elements 94, the linear SMA actuator rods 92 become austenitic and reduce in length. This causes the collar 117 to move further into the housing 88 and the collar teeth 123 to move off the connector teeth 125. This also causes the springs 90' to compress further, since the linear force of the SMA actuator rods 92 is greater than the compressive force of the springs 90'. In moving off the teeth, the collar frees the connector 28 to rotate. The housing side arms engage the collar notches to restrain collar rotation. The actuator assembly is free to rotate. Once heat is removed from the linear SMA actuator rods 92, the compression force of the springs 90' forces the collar teeth back onto the connector teeth. This further causes the now martensitic linear SMA actuator rods 92 to re-deform to a stretched length.

FIGS. 15A and 15B illustrate a second embodiment of a locking assembly formed in accordance with the present invention. The second embodiment locking assembly 140 includes a brake cylinder 142, a brake housing 144, a pair of shape memory alloy cylinders 146', 146, a short connector 148, a shaft 150, and heating elements 152.

Referring to FIGS. 15A and 15B, the housing 144 is rectangularly shaped and includes a front surface 154; an opposed back surfaces (not shown); a through-hole 156 extending through the housing crosswise to the front and back surfaces; first and second end surfaces 158, 160; a circular longitudinal hole 162 extending through the housing crosswise to the first and second end surfaces; first and second side surfaces 164, 166; and an H-shaped passage 168 extending through the housing crosswise to the first and second side surfaces 164, 166. The housing portions defined by the H-shaped passage and the through-hole form first opposed platforms 170, 170' and second opposed platforms 172, 172'. The through-hole 156 further defines first and second inner faces 174, 176 that are located parallel to the first and second end surfaces 158, 160, respectively. The housing 144 is preferably formed from a high strength steel alloy capable of withstanding repeated stretch cycles.

Still referring to FIGS. 15A and 15B, the cylinder 142 length is greater than the distance between the inner first and second opposed inner faces 174, 176 when the housing is in an unstretched (i.e., undeformed) state. The shaft 150 is longer than the distance between the housing first and second end surfaces 158, 160. The shaft 150 includes a first end 180 adapted to connect to the super elastic return spring 26 via the short connector 148. The shaft includes a second end 182 adapted to connect to an object 66 to be rotated. The pair of SMA cylinders 146, 146' are trained in compression. Therefore, in an austenitic state, the SMA cylinders will elongated to their memory size.

To assembly the second embodiment locking assembly 140, the housing first and second opposed inner faces 174, 176 are stretched apart and the brake cylinder 142 is inserted into the housing through-hole 156 until the cylinder aligns with the housing longitudinal hole 162. The housing faces are released and the shaft 150 is inserted into the housing longitudinal hole 162 and the cylinder 142. The shaft 150 is held therein using a number of transverse pins 184. The shaft first end 180 is connected to the super elastic return spring 26 via the connector 148, and the brake housing 140 is connected to the housing 88. In FIG. 15B, this is accomplished using two screws 186, 186' that interconnect between the housing proximal end 112 and corresponding screw holes 188, 188' in the housing.

In the assembled position, the brake housing 144 is under tension, being stretched by the inserted cylinder. This creates a significant amount of frictional force between the cylinder end surfaces and the housing first and second opposed inner faces 174, 176. Because the shaft 150 is connected to the cylinder 142 and the cylinder is frictionally restrained from rotating, the shaft 150 and the super elastic return spring 26 are also restrained from rotating.

Activating the heating elements 152, 152' heats the pair of SMA cylinders 146, 146', causing them to elongate and push between the opposed platforms 170, 170' and 172, 172'. This causes the distance between the first and second opposed inner housing faces to increase and to eventually release their frictional contact with the cylinder ends. The shaft 150 is thereby free to rotate with the super elastic return spring 62 upon application of heat to the SMA torque tube 24.

As will be appreciated from the foregoing, a locking assembly formed in accordance with the present is usually engaged, thereby preventing actuator rotation. Upon application of heat to the linear SMA actuator rods 92 or the SMA cylinders 146, 146' and their transition into austenitic state, the lock is released and the actuator assembly may be activated to provide torque. This is advantageous in that the lock is always "on" without requiring continued application of heat. Instead, heat is only required to disengage the locking assembly. Further, the lock assembly may be used to provide locking of the actuator assembly at an in-between position.

As will further be appreciated from the foregoing, a rotary actuator formed in accordance with the present invention provides a significant amount of torque for a single direction of rotation or for both directions. If only one direction of torque is required, then the heat to the SMA torque tube may be discontinued and the return spring may be used to zero the actuator. If it is desired to still provide some resistance during the return path, the SMA torque tube may be heated according to a schedule that produces the desired resistance. If torque is required in both directions of rotation, the return spring may be increased in strength and heat may be varied appropriately.

A benefit of having the super elastic return spring continuously attempting to return the actuator assembly to its initial position, is that it does not require any application of heat. A benefit of the locking mechanism is that is it can lock the actuator at a particular position without requiring the continued application of heat. Therefore, the present invention rotary actuator generates high mechanical rotational force, can be locked into multiple positions without continuous use of electrical power, and automatically returns to the neutral position when the SMA operated lock is disengaged.

The above benefits are particularly advantageous when applied to rotor craft blades. Referring to FIG. 16A, there shown is an illustration of a present invention rotary actuator used to twist a helicopter or tilt-rotor blade 200 (shown in phantom) about a longitudinal axis. Traditionally, a helicopter blade includes a longitudinal twist profile that is of a fixed geometry, determined as a compromise between the blade position desired for optimal hover performance and the blade position desired for optimal cruise performance.

Known movable wing twist arrangements rely on using an actuator to twist the blade by nearly the full amount rotated by the actuator. For example, a 12 degree actuator rotation would produce about a 12 degree wing tip rotation. This requires using a heavy, stiff, torque tube having only minimal torsional distortion properties. Heavy torque tubes are impractical for rotor craft blade applications.

The present invention SMA rotary actuator 18 provides sufficiently high angle output and high torque output so as to allow the use of a torsionally flexible passive torque tube that is lightweight compared with stiff torque tubes. Instead of a one-to-one correlation between the actuator rotation angle and the blade tip rotation angle, the present invention actuator rotates much more than is necessary at the blade tip. The torsionally flexible passive torque tube twists so that the resulting blade tip rotation is as desired. Further, the present invention actuator is sufficiently small to fit into thin rotor craft blades.

Referring to FIG. 16A, the blade includes a blade root 202 connected to a conventional hub (not shown) and a blade tip 204. The blade comprises a structural spar 205 extending longitudinally and a surrounding aerodynamically-shaped structure 211. Referring to FIG. 16B, the cross-sectional shape of the spar is generally rectangular. The cross-sectional shape of the skins is of a cambered airfoil. Other shapes may be used. A rotary actuator 18 is positioned within the spar near the blade root, and is fixedly attached therein. Shown in FIG. 16A, the rotary actuator housing distal end is connected to helicopter blade root structure using a blade connection mechanism 212. Because the actuator housing is preferably made of metal and blade spars are typically made of composites, the method used to attach the housing and spar may include one of those known to provide a secure connection between the two materials. Referring to FIG. 16B, the rotary actuator housing distal end is shaped to mate with the inner spar surface, to further reducing the possibility of rotary motion between the housing and the spar.

A passive torque tube 206 is positioned within the blade spar and includes a distal end 205 connected to the blade tip 204 via a tip connection mechanism 208. The passive torque tube 206 further includes a proximal end 207 connected to the rotary actuator 18. The rotary actuator 18 shown in FIG. 16A is the embodiment described above with reference to FIG. 1. Therefore, the passive torque tube proximal end 207 is connected to the actuator connector second end 60. Various support components 210 are optionally provided and located along the distance of the passive torque tube 206 within the spar.

During use, the angular output of the rotary actuator 18 is much greater than the angle needed at the blade tip. The passive torque tube proximal end 207 follows the actuator output. The connection of the passive torque tube 206 at the blade tip provides a counter-acting rotational torque at the tube's distal end 205. The result is a twist rotation of the spar such that the resulting blade tip rotation angle is of the desired amount. The passive torque tube 206 is preferably sized and formed according to the angular twist requirements of the blade, the stiffness of the spar and surrounding structure, and the angular twist capability of the actuator.

In one preferred embodiment, rotation of the present invention rotary actuator by about 50 degrees, causes rotation of the passive torque tube by about 42 degrees and rotation of the blade by about 8 degrees. Preferred maximum rotary actuator rotation amounts are in the range of about 30 degrees to about 60 degrees. Preferred passive torque tube maximum rotation amounts (as measured end-to-end) are in the range of about 18 degrees to about 54 degrees. Preferred maximum longitudinal blade tip rotation amounts are in the range of about 6 degrees to about 12 degrees.

As will be appreciated from the above, using the present invention rotary actuator allows the helicopter blade twist angle to be changed between cruise and hover operating conditions, significantly improving helicopter performance. This blade twist system minimizes system weight and minimally impacts rotor craft blade torsion stiffness.

While the preferred embodiment of this invention has been illustrated and described, it will be appreciated that various changes can be made therein without departing from the spirit and scope of these inventions.

The embodiments of the invention in which an exclusive property or privilege is claimed are defined as follows:

1. A rotary actuator for rotating an object, the rotary actuator comprising:
   (a) a torque tube formed of a shape memory alloy, the torque tube having a proximal end and a distal end;
   (b) a super elastic return spring having a proximal end connected to the torque tube proximal end and a distal end connected to the torque tube distal end; the torque tube being longitudinally twisted relative to the super elastic return spring; and
   (c) a torque tube heating element positioned near the torque tube;
   wherein heating of the heating element causes the torque tube to enter an austenitic state in which the torque tube returns to its previous untwisted configuration; and wherein removal of heat allows the torque tube to return to a martensitic state thereby allowing the super elastic return spring to retwist the torque tube.

2. The rotary actuator according to claim 1, wherein the super elastic return spring and the heating element are located within the torque tube, the heating element being positioned between the super elastic return spring and the torque tube.

3. The rotary actuator according to claim 1, wherein the heating element includes six layers stacked one on top of each other and rolled into a tubular shape, the layers being formed from the group including metal tape, Kapton tape, and Nicrome foil.

4. The rotary actuator according to claim 1, further comprising a housing, the torque tube and the super elastic return spring being located within the housing.

5. The rotary actuator according to claim 4, wherein the super elastic return spring is located within the torque tube, the super elastic return spring and torque tube are located within the housing, and the heating element is positioned between the torque tube and the housing.

6. The rotary actuator according to claim 5, wherein the heating element includes a tubular structure having an exterior surface, a first layer of electrically insulating material formed on the structure exterior surface, a heating foil wound about the first layer, a second layer of electrically insulating material formed on the heating foil.

7. The rotary actuator according to claim 1, wherein the super elastic return spring is adapted to connect to the object.

8. The rotary actuator according to claim 1, wherein the maximum twist angle of the torque tube relative to the return spring is an amount in the range of about 5 degrees to about 70 degrees.

9. The rotary actuator according to claim 1, wherein the super elastic return spring and the torque tube are connected via retaining pins.

10. The rotary actuator according to claim 1, further comprising a connector attached to the super elastic return spring proximal end and a locking assembly comprising:
   (a) a housing having proximal and distal ends, the torque tube and the super elastic return spring being located within the housing, at least one of the torque tube and super elastic return spring being connected to the housing distal end;
   (b) a locking component having first and second positions, wherein in the first position the locking component is non-rotatably engaged with the connector and in the second position the locking component is rotatably engaged with the connector;
   (c) a spring positioned between the locking component and the housing distal end for continuously urging the locking component into its first position;
   (d) at least one shape memory alloy rod stretched while in a martensitic state to interconnect between the housing distal end and the locking component, the at least one rod being trained for memory in length; and
   (e) a heating element adapted to heat the at least one actuator rod;
   wherein activating the heating element causes the at least one rod to enter an austenitic state in which the rod returns to its unstretched length, further causing the locking component to move to its second position to allow rotation of the connector and the attached super elastic return spring.

11. The rotary actuator according to claim 10, wherein the locking component is a socket and the engagement of socket with the connector includes a multi-sided surface connection.

12. The rotary actuator according to claim 10, wherein the locking component is a socket and the locking assembly further includes a yoke, the interconnection of the at least one shape memory alloy rod and the locking component being accomplished by the rod connecting directly to the yoke and the yoke being positioned adjacent the socket, the socket thereby being located between the housing distal end and the yoke.

13. The rotary actuator according to claim 10, wherein the locking component is a collar and the engagement of the collar with the connector includes a plurality of gear teeth.

14. The rotary actuator according to claim 1, further comprising a connector attached to the super elastic return spring proximal end and further comprising a locking assembly having locked and unlocked positions, the locking assembly comprising:
 (a) a tubular housing having proximal and distal ends, the combination of the return spring and torque tube being located within the housing, the housing further including an interior abutment face located near its proximal end; the connector including a middle region, a proximal end attached to the housing proximal end, and an engagement surface located therebetween;
 (b) a socket having a first end formed with a mating engagement surface, the socket being located about the connector near its proximal end; a compression spring located about the connector and compressed between the socket and the housing interior abutment face; a yoke positioned about the connector middle region and contacting the socket first end;
 (c) at least one shape memory alloy actuator rod stretched while in a martensitic state to interconnect between the housing distal end and the yoke, the at least one rod being trained for memory in length; and a heating element adapted to heat the at least one actuator rod;
 whereby activating the rod heating element causes the at least one rod to enter an austenitic state in which the rod returns to its unstretched length, further causing the yoke to push the socket and compress the spring, the movement of the socket allowing disengagement between the mating non-circular connector and socket surfaces, further allowing the rotation of the torque tube.

15. The rotary actuator according to claim 14 wherein the socket mating engagement surface and the connector engagement surface include a multi-sided surface connection.

16. The rotary actuator according to claim 4, further comprising a connector attached to the super elastic return spring proximal end and a locking assembly comprising:
 (a) a brake housing having a through-hole with a longitudinal height, a longitudinal hole, and opposed inner platforms, the break housing being connected to the housing;
 (b) a cylinder having a length in an amount larger than the longitudinal through-hole height, the brake housing being stretched and the cylinder inserted into the through-hole to align with the longitudinal hole, the cylinder being held within the brake housing by friction of an amount sufficient to prohibit rotation of the cylinder;
 (c) a pair of shape memory alloy cylinders trained in compression and positioned between the brake housing opposed inner platforms, the directional orientation of compression being parallel with the longitudinal hole; a heating element in contact with each cylinder;
 (d) a shaft positioned through the brake housing longitudinal hole and non-rotatably attached to the cylinder, one end of the shaft connected to the super elastic return spring via the connector, the other end of the shaft adapted to connect to the object;
 wherein activating the heating elements causes the shape memory alloy cylinders to enter an austenitic state in which they return to their uncompressed length, causing the brake housing to elongate and release frictional contact with the cylinder.

17. A helicopter blade twist rotation system for use with a helicopter blade having a blade root end, a blade tip end, and a longitudinal spar extending from the blade root end toward the blade tip, the system comprising:
 (a) a shape memory alloy rotary actuator adapted to be connected to the blade spar near the blade root; and
 (b) a torsionally flexible passive torque tube adapted to be connected to the blade spar, the passive torque tube having a proximal end connected to the rotary actuator and a distal end connected to the blade near to the blade tip;
 wherein rotation of the rotary actuator causes like rotation of the torque tube proximal end and rotation of the torque tube distal end of an amount less than the rotation angle of the torque tube proximal end.

18. A helicopter blade rotation system according to claim 17, wherein the shape memory rotary actuator is rotated by an amount up to 70 degrees to cause a rotation of the passive torque tube distal end by an amount up to 20 degrees.

19. A helicopter blade rotation system according to claim 17, wherein the passive torque tube is formed from a material in the group comprising a metal and a structural composite.

20. A helicopter blade rotation system according to claim 17, wherein the spar includes an interior area and wherein the rotary actuator includes a housing having a distal end connected directly to the spar interior.

21. A helicopter blade rotation system according to claim 17, wherein the rotary actuator comprises:
 (a) a torque tube formed of a shape memory alloy, the torque tube having a proximal end and a distal end;
 (b) a super elastic return spring having a proximal end connected to the torque tube proximal end and a distal end connected to the torque tube distal end; the torque tube being longitudinally twisted relative to the super elastic return spring; and
 (c) a torque tube heating element positioned near the torque tube;
 wherein heating of the heating element causes the torque tube to enter an austenitic state in which the torque tube returns to its previous untwisted configuration; and wherein removal of heat allows the torque tube to return to a martensitic state thereby allowing the super elastic return spring to retwist the torque tube.

22. A helicopter blade rotation system according to claim 21, further comprising a housing, wherein the super elastic return spring is located within the torque tube, the super elastic return spring and torque tube are located within the housing, and the heating element is positioned between the torque tube and the housing.

23. A helicopter blade rotation system according to claim 22, wherein the heating element includes a tubular structure having an exterior surface, a first layer of electrically insulating material formed on the structure exterior surface, a heating foil wound about the first layer, a second layer of electrically insulating material formed on the heating foil.

24. A helicopter blade rotation system according to claim 22, wherein the super elastic return spring is connected to the passive torque tube.

25. A helicopter blade rotation system according to claim 22, wherein the maximum twist angle of the torque tube relative to the return spring is an amount in the range of about 20 degrees to about 70 degrees.

26. A helicopter blade rotation system according to claim 22, further comprising a connector attached to the super elastic return spring proximal end and a locking assembly comprising:
   (a) a housing having proximal and distal ends, the torque tube and the super elastic return spring being located within the housing, at least one of the torque tube and super elastic return spring being connected to the housing distal end;
   (b) a locking component having first and second positions, wherein in the first position the locking component is non-rotatably engaged with the connector and in the second position the locking component is rotatably engaged with the connector;
   (c) a spring positioned between the locking component and the housing distal end for continuously urging the locking component into its first position;
   (d) at least one shape memory alloy rod stretched while in a martensitic state to interconnect between the housing distal end and the locking component, the at least one rod being trained for memory in length; and
   (e) a heating element adapted to heat the at least one actuator rod;
   wherein activating the heating element causes the at least one rod to enter an austenitic state in which the rod returns to its unstretched length, further causing the locking component to move to its second position to allow rotation of the connector and the attached super elastic return spring.

27. A helicopter blade rotation system according to claim 22, wherein the socket mating engagement surface and the connector engagement surface include a multi-sided surface connection.

28. A helicopter blade rotation system according to claim 22, further comprising a connector attached to the super elastic return spring proximal end and further comprising a locking assembly having locked and unlocked positions, the locking assembly comprising:
   (a) a tubular housing having proximal and distal ends, the combination of the return spring and torque tube being located within the housing, the housing further including an interior abutment face located near its proximal end; the connector including a middle region, a proximal end attached to the housing proximal end, and an engagement surface located therebetween;
   (b) a socket having a first end formed with a mating engagement surface, the socket being located about the connector near its proximal end; a compression spring located about the connector and compressed between the socket and the housing interior abutment face; a yoke positioned about the connector middle region and contacting the socket first end;
   (c) at least one shape memory alloy actuator rod stretched while in a martensitic state to interconnect between the housing distal end and the yoke, the at least one rod being trained for memory in length; and a heating element adapted to heat the at least one actuator rod;
   whereby activating the rod heating element causes the at least one rod to enter an austenitic state in which the rod returns to its unstretched length, further causing the yoke to push the socket and compress the spring, the movement of the socket allowing disengagement between the mating non-circular connector and socket surfaces, further allowing the rotation of the torque tube.

* * * * *

UNITED STATES PATENT AND TRADEMARK OFFICE
CERTIFICATE OF CORRECTION

PATENT NO. : 6,065,934
DATED : May 23, 2000
INVENTOR(S) : A.D. Jacot et al.

It is certified that error appears in the above-identified patent and that said Letters Patent is hereby corrected as shown below:

Column 15, (claim 16, line 6),
Line 60, "break" should be -- brake --

Signed and Sealed this

Ninth Day of October, 2001

*Attest:*

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 6,065,934
DATED        : May 23, 2000
INVENTOR(S)  : A.D. Jacot et al.

It is certified that error appears in the above-identified patent and that said Letters Patent is hereby corrected as shown below:

Column 15,
Line 60, "break" should be -- brake --

Column 18,
Line 4, "22," should be -- 28, --

This certificate supercedes Certificate of Correction Issued on October 9, 2001

Signed and Sealed this

Eighteenth Day of March, 2003

JAMES E. ROGAN
*Director of the United States Patent and Trademark Office*